Figure 1:
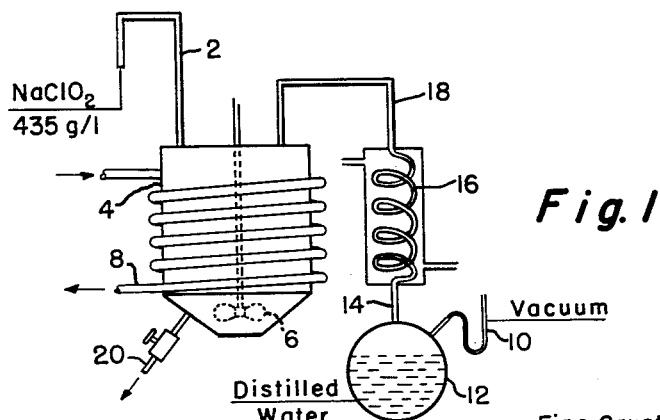

Oct. 31, 1961           P. MOLLARD         3,006,721
PROCESS OF MAKING A SODIUM CHLORITE PRODUCT
AND PRODUCT OBTAINED THEREBY
Filed March 8, 1960

INVENTOR.
Paul Mollard

BY

HIS ATTORNEYS

United States Patent Office 3,006,721
Patented Oct. 31, 1961

3,006,721
PROCESS OF MAKING A SODIUM CHLORITE PRODUCT AND PRODUCT OBTAINED THEREBY
Paul Moilard, Pierre-Benite, France, assignor to Societe d'Electro-Chimie d'Electro-Metallurgie et des Acieries Electriques d'Ugine, Paris, France, a corporation of France
Filed Mar. 8, 1960, Ser. No. 13,507
Claims priority, application France Mar. 10, 1959
3 Claims. (Cl. 23—85)

This invention relates to a process of making a commercial sodium chlorite product and the product obtained thereby, the product being in the form of grains or agglomerates of desired size, having low density and a high dissolving speed.

The method generally used commercially for preparing commercial sodium chlorite consists in concentrating by evaporation a sodium chlorite solution, generally obtained by reacting, in a suitable absorption apparatus, chlorine dioxide ($ClO_2$) and sodium peroxide in an aqueous solution. The saturated solutions leaving the absorption apparatus are conducted to an evaporator serving at the same time as a crystallizer. The evaporation of water causes a crystallization of anhydrous sodium chlorite accompanied by a precipitation of the dissolved mineral substances such as sodium carbonates, chlorides, nitrates and tartrates. The hot suspension so obtained, which is at a temperature of about 60–70° C., is then passed through a filter. During the filtration, the liquid cools and when the temperature gets below 38° C., a deposit of crystallized sodium chlorite trihydrate is formed on the filter, in addition to the crystallized substances initially contained in suspension in the solution. A heterogeneous mixture of different substances is so obtained, composed in its major part of anhydrous sodium chlorite and crystallized sodium chlorite trihydrate. The $NaClO_2$ content of the final product depends upon the proportions of the two crystalline varieties of chlorite but generally is between 50 and 85% by weight. The heterogeneous filter cake obtained on the filter is then dried by any suitable means.

In this application, all proportions are by weight unless otherwise stated.

As a matter of fact, the well known solubility curve of sodium chlorite (Ulmann, T.V., Journal of American Chem. Society, 1955, page 799) indicates a transition point at 38° C., above which the precipitated sodium chlorite is anhydrous and below which the precipitate is sodium chlorite trihydrate.

In another process of preparing commercial sodium chlorite, the suspension of crystals leaving the evaporator is atomized, whereby the liquid is completely evaporated and a pulverous dry product is directly obtained.

A dry evaporation process has also been utilized which consists in pouring the sodium chlorite solution onto heated rolls. This process furnishes a product in the form of flakes having a thickness between 1 and 2 mm.

These prior known processes present numerous disadvantages. In the first place, they often are discontinuous. Besides, they require that the concentration of the sodium chlorite solution be carried out under vacuum and, therefore, at a relatively low temperature in order to avoid risk of explosion. Moreover, all of the dissolved substances crystallize with the sodium chlorite and some of them, such as iron salts for example, have a harmful effect upon the stability of the product. Finally, the filtering of the crystalline paste coming from the evaporation operation is difficult because, depending upon the cooling rate of the solution, a crystallized filter cake is collected on the filter, the ratio of anhydrous $NaClO_2$ to $NaClO_2.3H_2O$ in the filter cake varying substantially, and which coagulates during the cooling. There is also the risk of obtaining low yields due to the passage of very fine crystals through the filter.

The commercial products obtained by these prior known processes are pulverous, heterogeneous, with $NaClO_2$ content between 50 and 85%, and formed of a mixture of $NaClO_2.3H_2O$ crystals crystallized below 38° C. and anhydrous sodium chlorite crystallized above 38° C. and accompanied by the above mentioned foreign substances. The products have a strong tendency to agglomerate, it generally being necessary for the user to grind the agglomerates before using them.

These disadvantages of prior known methods are overcome according to the present invention. The present invention relates to a process for manufacturing commercial sodium chlorite which comprises producing, in a first stage, crystallized sodium chlorite trihydrate obtained by any known means, but preferably by cooling a saturated sodium chlorite solution and then, in a second stage, heating the sodium chlorite trihydrate crystals externally at a temperature and for a time sufficient to partially dehydrate the crystals and thereby form a sodium chlorite product constituted by a kernel of sodium chlorite trihydrate surrounded by a shell of anhydrous sodium chlorite.

The initial sodium chlorite solution obtained, for example, by reacting in a suitable apparatus chlorine dioxide and an aqueous sodium peroxide solution, generally contains 400–500 g./l. of $NaClO_2$.

The present invention can be carried out in different ways.

A first process for obtaining sodium chlorite trihydrate crystals according to the first stage of the present invention consists in evaporating the initial sodium chlorite solution and crystallizing the sodium chlorite trihydrate in the same apparatus operating under vacuum at a temperature below the transition point of 38° C. Such process is illustrated in FIGURE 1.

A second process for obtaining sodium chlorite trihydrate crystals according to the first stage of the present invention consists in concentrating the initial sodium chlorite solution in an evaporator operating under vacuum and at a temperature below 38° C. in order to produce a concentrated solution and then conveying the concentrated solution through a crystallizer column containing a suspension of fine crystals of sodium chlorite trihydrate maintained in the form of a fluid bed. This process is illustrated in FIGURE 2.

A third process for obtaining sodium chloride trihydrate crystals according to the first stage of the present invention, this being applicant's preferred process, comprises cooling the initial sodium chlorite solution, without previous concentration, to a temperature below 38° C. and then passing the cooled solution through a crystallizer column containing a suspension of fine crystals of sodium chlorite trihydrate maintained in the form of a fluid bed. The thermal balance involved in this method is particularly favorable. This process is illustrated in FIGURE 3.

Figure 2:
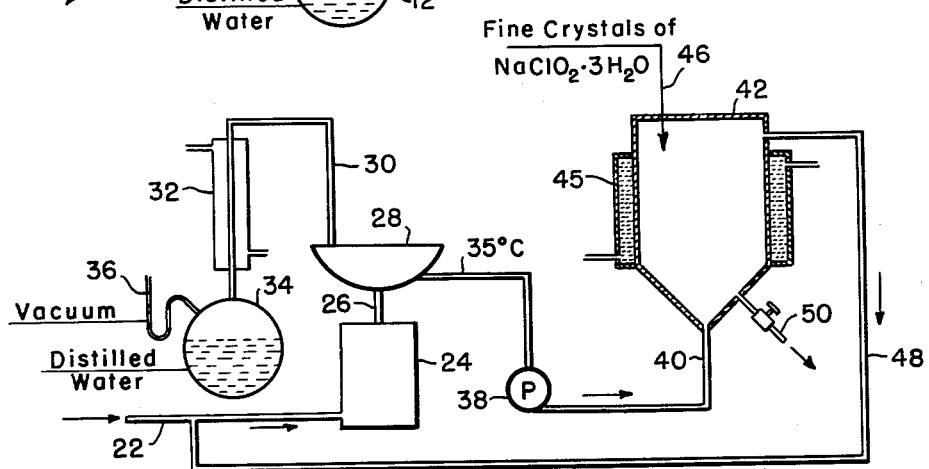
Figure 3:
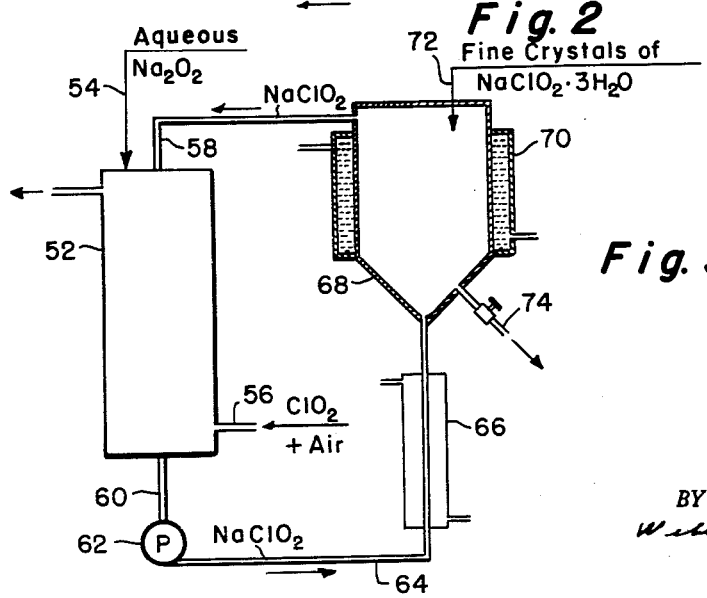

The second and third processes just referred to and illustrated in FIGURES 2 and 3, in which a sodium chlorite solution is passed through a crystallizer column containing a suspension of fine crystals of sodium chlorite trihydrate maintained in the form of a fluid bed, can be carried out in the manner described more particularly in applicant's copending application Serial No. 777,516 filed December 1, 1958. The method disclosed in that application, when applied to the production of sodium chlorite trihydrate crystals, comprises flowing a supersaturated solution of sodium chlorite upwardly through the crystallizer column, introducing fine crystals of sodium chlorite trihydrate into the column, maintaining a fluid bed suspension of said fine crystals in said upwardly flowing supersaturated solution to cause the bonding of said fine crystals by sodium chlorite supplied by said supersaturated solution and form agglomerates from said fine crystals of sodium chlorite, allowing said agglomerates to settle, removing said agglomerates from said column, removing the sodium chlorite solution of lowered strength from the column and then regenerating it to bring it to the supersaturated state, and thereafter returning it to the column.

In flowing the supersaturated sodium chlorite solution through the fluid bed of fine crytsals of sodium chlorite trihydrate in the crystallizer column, the fine crystals of sodium chlorite trihydrate are maintained in suspension by the ascending liquid. The fine crystals of sodium chlorite triyhydrate become larger due to the bonding of the fine crystals into agglomerates by sodium chlorite supplied by the supersaturated solution. This bonding or agglomeration of the fine crystals of sodium chlorite trihydrate results in lowering the strength of the sodium chlorite solution which leaves the crystallizer column. In passing through the crystallizer column, wherein the supersaturated solution of sodium chlorite provides sodium chlorite for bonding the fine crystals of sodium chlorite trihydrate, the concentration of sodium chlorite decreases in an amount generally of from 30–50 g. of $NaClO_2$ per liter. The sodium chlorite solution of lowered strength leaving the crystallizer column is either concentrated by evaporation, for example, as shown in FIGURE 2, or is regenerated as shown in FIGURE 3 and is then recycled through the crystallizer column. The crystals can be extracted from the crystallizer column either continuously or discontinuously and are drained and dried.

The operation carried out in the crystallizer column can be regulated to obtain either big crystals or crystal agglomerates in the desired grain sizes. These products are easy to drain and dry.

After having produced the sodium chlorite trihydrate crystals by any of the methods described or by any other suitable method, these crystals are heated externally in a second stage to produce a partial dehydration whereby the crystals have a core or kernel of sodium chlorite trihydrate and an envelope or shell of anhydrous sodium chlorite. This drying can be carried out easily by hot air in any suitable apparatus. By choosing an adequate drying curve and the usual means of regulating and controlling the temperature, the dehydration of sodium chlorite trihydrate can be carried out to the desired degree in order to obtain at the dryer outlet the commercial product with the desired $NaClO_2$ content. The drying is carried out by heating the crystals to a temperature not exceeding 38° C. in order to avoid as far as possible the fusion of sodium chlorite trihydrate in its water crystallization.

In contrast to products obtained by known processes, the sodium chlorite particles obtained according to the present invention are formed of a sodium chlorite trihydrate core or kernel surrounded by an envelope or shell of anhydrous sodium chlorite. They are much more stable during storage and it is not necessary to grind them prior to using them. Prior to heating them, the particles are composed substantially entirely of $$NaClO_2 \cdot 3H_2O$$

The loss of a certain quantity of water during drying is accompanied by the formation of multiple cells in the product, which is shown by an apparent density of the final product which is much lower than that of other products on the market. The product of the present invention has a high dissolution speed which is advantageous in the use of the product and, even though the product contains cells, it has adequate strength.

The following non-limiting examples further illustrate the invention.

*Example 1*

Referring to FIGURE 1, a sodium chlorite solution containing 435 g./l. of $NaClO_2$ was introduced through pipe 2 into an evaporator crystallizer 4 having a useful volume of 500 liters. The evaporator 4 was provided with a stirrer 6 and a heating coil 8 and was maintained at a temperature of 36° C. under an absolute pressure of 27 mm. mercury by a vacuum device 10 connected to a container 12. The container 12 was connected by pipe 14, condenser 16 and pipe 18 to the evaporator 4.

The sodium chlorite solution was fed continuously at the rate of 500 liters per hour corresponding to the quantity of water condensed by the condenser 16. The level inside the crystallizer rose regularly owing to the precipitation of crystals but the volume of liquid per se remained constant.

At the start of the operation, the useful volume of the apparatus, say 500 liters, was formed by about 430 liters of a sodium chlorite solution containing 760 g./l. of $NaClO_2$ and 100 kgs. of crystallized sodium chlorite $NaClO_2 \cdot 3H_2O$ forming 200 g. of a suspension of crystals per liter of useful volume.

After 1 hour of operation, the weight of crystals inside the evaporator was practically tripled. Then ¾ of the volume of the obtained crystalline compound was drawn off from the evaporator through discharge outlet 20, amounting to about 200 kgs. of $NaClO_2.3H_2O$. A residual charge of sodium chlorite trihydrate was left in the evaporator for starting the following operation. If desired, fine crystals of $NaClO_2.3H_2O$ can be added to the residual charge left in the evaporator if the rate of evaporation is not great enough to cause crystallization by itself. The dimensions of the crystals formed in the evaporator can be regulated by regulating the supply of these fine crystals.

After draining of the suspension, $NaClO_2.3H_2O$ crystals were obtained with an average dimension of 2 mm. and an apparent density of 515–544 g./dm.³ which, after having been dehydrated as described in Example 3 given hereunder, resulted in a commercial product having a density of 495–500 g./dm.³.

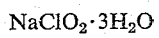

*Example 2*

Referring to FIGURE 2, a sodium chlorite solution containing 435 g./l. of $NaClO_2$ was fed by a pipe 22 to a tubular evaporator 24 at the rate of 1150 liters per hour and operating under a vacuum, thereby concentrating the solution to a concentration of 580 g./l. of $NaClO_2$ at a temperature of 35° C. The tubular evaporator 24 was connected by a pipe 26 to a container 28 which in turn was connected by a pipe 30 provided with a condenser 32 to a container 34 connected to a vacuum device 36.

The solution leaving container 28 saturated at a temperature of 35° C. and at a concentration of 580 g./l. of $NaClO_2$ was pumped by a pump 38 through pipe 40 into the bottom of a crystallizer 42 provided with a cooling jacket 45. The crystallizer 42 contained a suspension of fine crystals (50 to 200 microns) of $NaClO_2.3H_2O$ added as indicated by the arrow 46 and maintained in the form of a fluid bed by the ascending current of injected liquid. The temperature of the fluid bed in the crystallizer was lower than the saturation temperature of the solution which was consequently supersaturated in the crystallizer. The solution at the top of the crystallizer contained 530 g./l. of $NaClO_2$. This solution of lowered strength was drawn off through a pipe 48, combined with the solution flowing through pipe 22, and was fed to the evaporator 24.

Under established working conditions, 800 kgs. per hour of $NaClO_2.3H_2O$ crystals were withdrawn from the crystallizer through discharge outlet 50 and were drained and dried. These crystals had an average diameter of about 3 mm. and an average apparent density of 530 g./dm.³.

In this example, all of the operations were carried out continuously.

The obtained sodium chlorite trihydrate crystals were then dehydrated according to the method as explained in connection with Example 3, thereby resulting in a commercial product having an apparent density of 500 g./dm.$^3$.

Example 3

Referring to FIGURE 3, which illustrates a preferred embodiment of the invention, an aqueous sodium peroxide solution was fed to an absorber 52 as indicated by arrow 54 and chlorine dioxide was fed to the absorber through pipe 56. Also, sodium chlorite solution containing 395 g./l. was fed into the absorber 52 through pipe 58. The sodium chlorite solution formed by reaction of sodium peroxide and chlorine dioxide in the absorber 52 was conducted through pipe 60 at a temperature of 20° C. and pumped by a pump 62 through pipe 64 cooled by a cooler 66 to a temperature of 14° C. and supplied to the bottom of a crystallizer column 68. The sodium chlorite solution was fed to the crystallizer 68 at a rate of 5 m.$^3$ per hour and was at a concentration of 435 g./l. The column 68 had a diameter of 0.6 m. and a height of 1.5 m. It was provided with a cooling jacket 70 which lowered the temperature of the solution in the column from a temperature of 14° C. at its base to a temperature of 6° C. at its top. Owing to this variation of temperature, the introduced solution was in a supersaturated state inside the column. Fine crystals of sodium chlorite trihydrate were fed into the column 68 as indicated by the arrow 72 and a fluid bed of these fine crystals was maintained by the ascending current of liquid. The fine crystals of sodium chlorite trihydrate had an average dimension of 0.3 mm. and were fed to the column at a rate of about 5 kgs. per hour.

Under established working conditions, the sodium chlorite solution of lowered strength at the top of the column 68 contained 395 g./l. of sodium chlorite and was conducted to the absorber 52 through pipe 58 as previously described.

In the column 68, there was thus deposited 435−395=40 g. of NaClO$_2$ per liter of introduced solution (about 200 kgs. per hour) in the form of sodium chlorite trihydrate crystals having dimensions of 1–3 mm. These crystals were withdrawn from time to time through the outlet 74 and were drained.

These crystals, after draining, were introduced into a rotary furnace 2 m. long and 30 cm. in diameter, the furnace being rotated at a speed such as to provide a 10-minute stay of the crystals in the furnace. Hot air at a temperature not exceeding 50° C. was flowed through the furnace countercurrent to the passage of the crystals. The crystals were partially dehydrated and at the same time were subjected to a bursting phenomenon created by the escape of water of hydration, thereby forming very fine crystals. During the descent inside the rotary furnace, the fine crystals were agglomerated again into big crystals, thereby leading finally to grains having approximately the same dimensions as the initial crystals. The grains finally obtained had a greater surface area owing to the presence of cells created by the escape of water at the time of drying, which increased their dissolving rate and decreased their density.

Sodium chlorite crystals thus obtained were composed of a core or kernel of sodium chlorite trihydrate enveloped in a shell or envelope of anhydrous sodium chlorite. The NaClO$_2$ content of the product could be easily regulated to between 70 and 90% by weight. These crystals, whose dimensions were between 2 and 3 mm., had an average apparent density of 480–500 g./dm.$^3$ and an NaClO$_2$ content of about 85%. By way of comparison, two products now on the market and designated herein as A and B had an apparent density of 935 and 640 g./dm.$^3$ respectively and an NaClO$_2$ content of 84 and 85% respectively.

The superior dissolving speed of products made according to the present invention (product C) as compared with the products A and B is shown by the following tests.

In a test glass of 500 cc. capacity and a height of 40 cm. and filled with water at the ambient temperature, 20 g. of each product were slowly introduced. After three minutes, the amount of dissolved NaClO$_2$ was measured. The results were as follows:

| Product: | G./l. |
|---|---|
| A | 6.31 |
| B | 2.9 |
| C | 15.4 |

The invention is not limited to the preferred embodiments but may be otherwise embodied or practiced within the scope of the following claims.

I claim:
1. The process of making a sodium chlorite product, which comprises producing sodium chlorite trihydrate crystals in a first stage and thereafter, in a second stage, heating the sodium chlorite trihydrate crystals externally to a temperature not exceeding 38° C. for a time sufficient to partially dehydrate the crystals and thereby form a sodium chlorite product constituted by a kernel of sodium chlorite trihydrate surrounded by a shell of anhydrous sodium chlorite, and controlling the external dehydration to produce a sodium chlorite product having a content of anhydrous sodium chlorite between 70 and 90% by weight.

2. A process according to claim 1, wherein, in the second stage, the sodium chlorite trihydrate crystals are externally dehydrated by contacting them with a current of hot air at a temperature not exceeding 50° C.

3. A sodium chlorite product comprising crystalline grains having a kernel of sodium chlorite trihydrate surrounded by a shell of anhydrous sodium chlorite, said shell constituting from 70 to 90% by weight of the product.

References Cited in the file of this patent

UNITED STATES PATENTS

| | | |
|---|---|---|
| 1,873,251 | Allen et al. | Aug. 23, 1932 |
| 2,164,111 | Jeremiassen | June 27, 1939 |
| 2,164,112 | Jeremiassen | June 27, 1939 |
| 2,169,066 | Cunningham | Aug. 8, 1939 |
| 2,496,288 | Hampel | Feb. 7, 1950 |
| 2,496,289 | Hampel | Feb. 7, 1950 |
| 2,520,915 | Cunningham | Sept. 5, 1950 |
| 2,616,783 | Wagner | Nov. 4, 1952 |
| 2,664,349 | Sable | Dec. 29, 1953 |
| 2,737,451 | Saeman | Mar. 6, 1956 |